United States Patent [19]

Naito et al.

[11] 3,886,139

[45] May 27, 1975

[54] DERIVATIVES OF KANAMYCIN

[75] Inventors: Takayuki Naito; Susumu Nakagawa; Yoshio Abe, all of Tokyo, Japan

[73] Assignee: Bristol-Myers Company, New York, N.Y.

[22] Filed: Feb. 23, 1973

[21] Appl. No.: 335,210

[52] U.S. Cl... 260/210 K; 260/210 AB; 260/210 R; 424/180
[51] Int. Cl.............................................. C07c 47/18
[58] Field of Search....... 260/210 AB, 210 K, 210 R

[56] References Cited
UNITED STATES PATENTS

| | | | |
|---|---|---|---|
| 3,032,547 | 5/1962 | Rothrock et al. | 260/210 K |
| 3,541,078 | 11/1970 | Woo et al. | 260/210 R |
| 3,753,973 | 8/1973 | Umazawa et al. | 260/210 K |
| 3,781,268 | 12/1973 | Kawaguchi et al. | 260/210 AB |

*Primary Examiner*—Johnnie R. Brown
*Attorney, Agent, or Firm*—Robert E. Havranek

[57] ABSTRACT

Derivatives of kanamycin A and B have been prepared which possess substantially improved anti-bacterial activity. An example of such an agent is 1-[L-(−)-δ-amino-α-hydroxyvaleryl]-kanamycin A [IVa, BB-K23].

7 Claims, No Drawings

DERIVATIVES OF KANAMYCIN

BACKGROUND OF THE INVENTION

1. Field of the Invention

This invention relates to a semisynthetic 1-substituted derivatives of kanamycin A or B, said compounds being prepared by acylating the 1-amino-function of kanamycin A or B with a δ-amino-α-hydroxyvaleryl moiety.

2. Description of the Prior Art

The kanamycins are known antibiotics described in Merck Index, 8th Edition, pp. 597–598. Kanamycin A is a compound having the formula

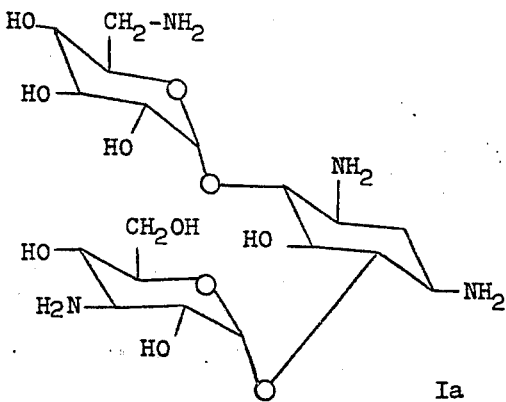

Ia

Kanamycin B is a compound having the formula

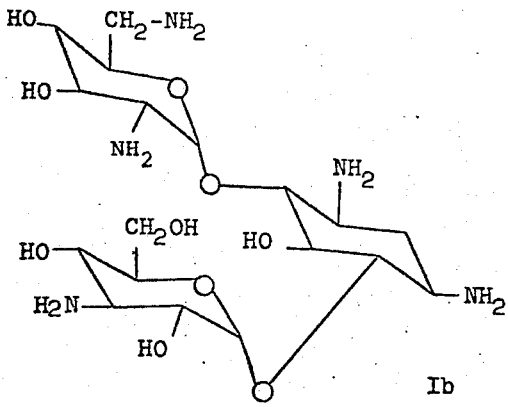

Ib

The compound designated 1-[L-(−)-Y-amino-α-hydroxybutyryl]kanamycin A [BB-K8] is described in the Journal of Antibiotics, 25(12), pp 695–731 (December 1972).

SUMMARY OF THE INVENTION

The compound having the formula

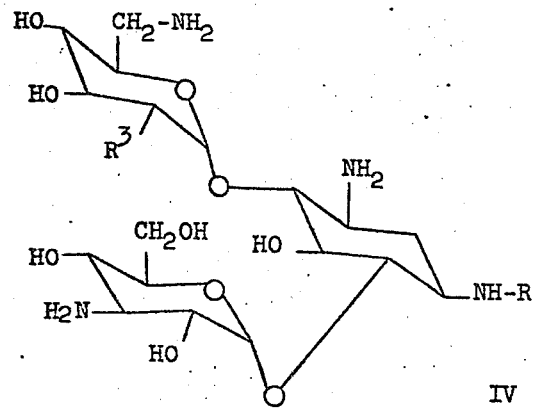

IV in which $R^3$ is OH or $NH_2$ and R is L-(−)-δ-amino-α-hydroxyvaleryl or a nontoxic pharmaceutically acceptable acid addition salt thereof is a valuable antibacterial agent.

This invention relates to semi-synthetic derivatives of kanamycin A and B, said compounds being known as 1-[L-(−)-δ-amino-α-hydroxyvaleryl] kanamycin A and B having the formula

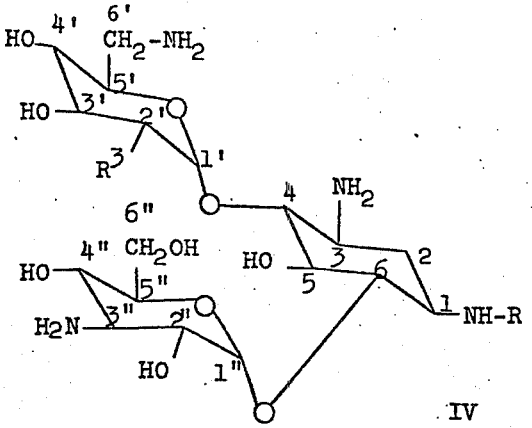

IV in which $R^3$ is OH or $NH_2$ and R is L-(−)-δ-amino-α-hydroxyvaleryl; or a nontoxic pharmaceutically acceptable acid addition salt thereof.

For the purpose of this disclosure, the term "nontoxic, pharmaceutically acceptable acid addition salt" shall mean a mono, di-, tri-, tetra, or pentasalt formed by the interaction of 1 molecule of compound IV with 1–5 moles of a nontoxic, pharmaceutically acceptable acid. Included among these acids are acetic, hydrochloric, sulfuric, maleic, phosphoric, nitric, hydrobromic, ascorbic, malic and citric acid, and those other acids commonly used to make salts of amine containing pharmaceuticals.

The compounds of the present invention are prepared by the following diagramatic scheme:

1.)  Kanamycin A      N-(Benzyloxycarbonyloxy)
     (Ia) or          ───────────────────────→
     Kanamycin B      Succinimide
     (Ib)

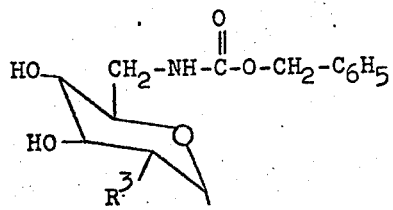

[6'-Monobenzyloxycarbonylkanamycin A or B]

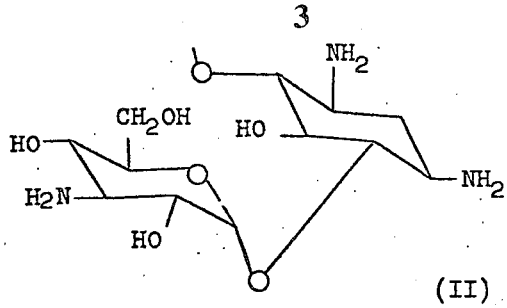
2.) Compound II    N-Hydroxysuccinimide ester of
L-(−)-δ-benzyloxycarbonyl-
amino-α-hydroxyvaleric acid
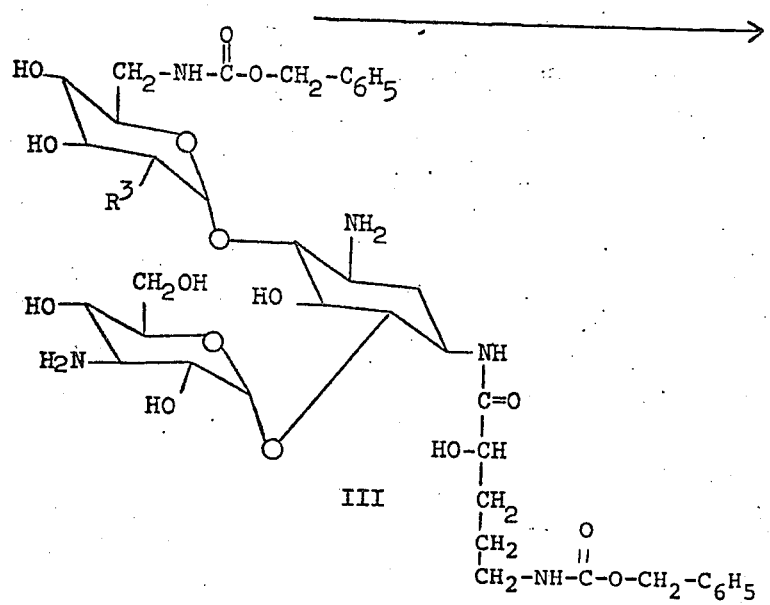
3.) Compound III    $H_2/Pd/C$ →
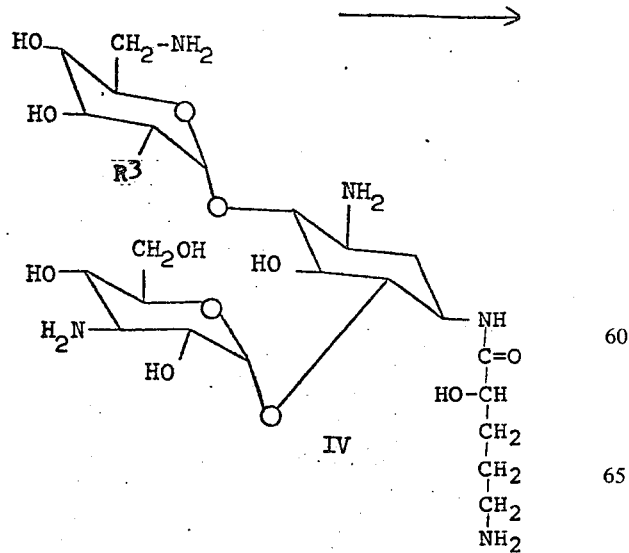

A preferred embodiment of the present invention is the compound having the formula

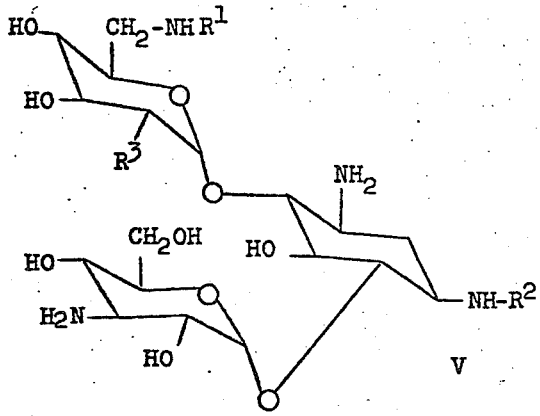

in which R¹ is H or

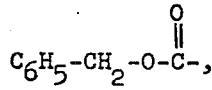

R² is H or L-(−)-δ-amino-α-hydroxyvaleryl and R³ is OH or NH₂ wherein R¹ or R² must be other than H; or a nontoxic pharmaceutically acceptable acid addition salt thereof.

Another preferred embodiment is the compound of formula V in which R¹ is

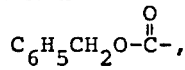

R² is H and R³ is OH or NH₂.

A more preferred embodiment is the compound of formula V in which R² is L-(−)-δ-amino-α-hydroxyvaleryl, R¹ is hydrogen and R³ is OH or NH₂.

A most preferred embodiment is the compound of formula V wherein R¹ is H, R² is L-(−)-δ-amino-α-hydroxyvaleryl and R³ is OH; or a nontoxic pharmaceutically acceptable acid addition salt thereof.

Another most preferred embodiment is the compound of formula V wherein R¹ is H, R² is L-(−)-δ-amino-α-hydroxyvaleryl and R³ is NH₂; or a nontoxic pharmaceutically acceptable and addition salt thereof.

Other most preferred embodiments are the sulfate, hydrochloride, acetate, maleate, citrate, ascorbate, nitrate or phosphate salts of compound V.

Another more preferred embodiment is the monosulfate salt of compound V.

Still another preferred embodiment is the disulfate salt of compound V.

The objectives of the present invention have been achieved, by the provision according to the present invention of the process for the preparation of the compound having the formula

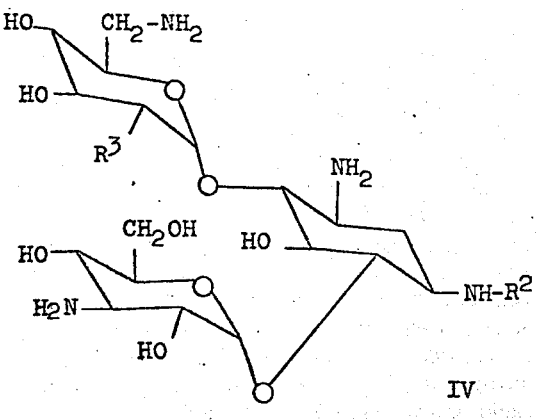

IV in which R² is L-(−)-δ-amino-α-hydroxyvaleryl and R³ is OH or NH₂; or a nontoxic pharmaceutically acceptable acid addition salt thereof; which process comprises the consecutive steps of A. acylating kanamycin A or kanamycin B with an acylating agent selected from the compounds having the formulas

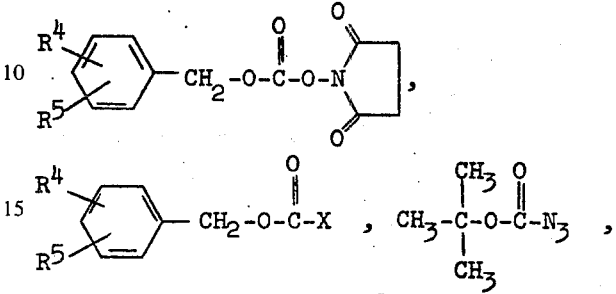

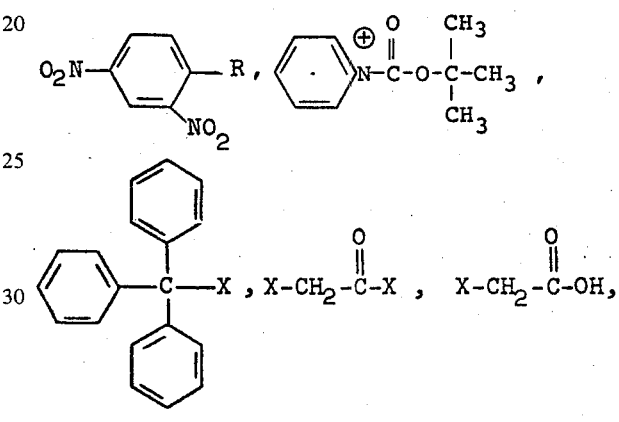

(or a carbodiimide thereof) or

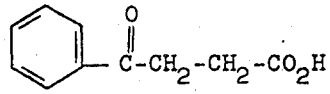

(or a carbodiimide thereof), in which R⁴ and R⁵ are alike or different and each is H, F, Cl, Br, NO₂, OH, (lower)alkyl or (lower)alkoxy, X is chloro, bromo or iodo, or a functional equivalent as an acylating agent; in a ratio of one mole or less of acylating agent per mole of kanamycin A or B in a solvent, preferably selected from the group comprised of dimethylformamide, dimethylacetamide, tetrahydrofuran, dioxane, 1,2-dimethoxyethane, methanol, ethanol, water, acetone, pyridine, N-(lower)alkylpiperidine, or mixtures thereof, but preferably dimethylformamide-water, at a temperature below 50° C. and preferably below 25° C., to produce the compound having the formula

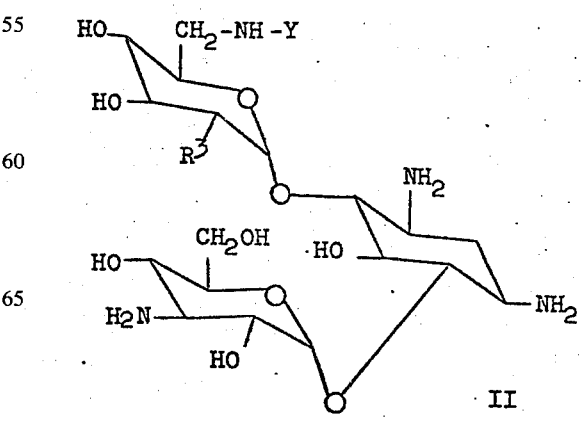

II in which Y is a radical of the formula

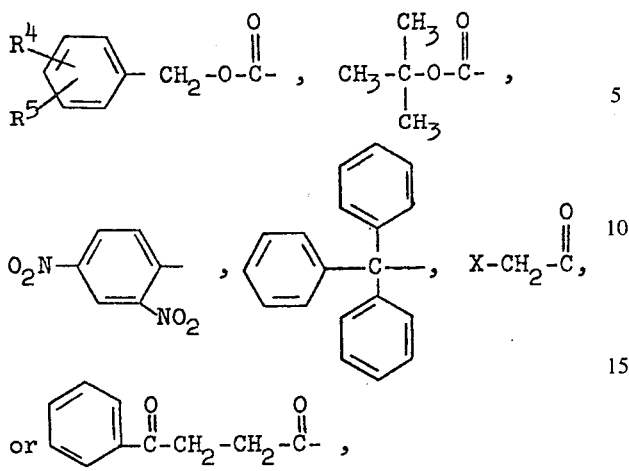

in which R⁴, R⁵ and R³ are as defined above;

B. acylating compound II with an acylating agent having the formula

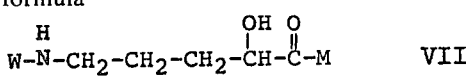

in which W is a radical selected from the group comprising

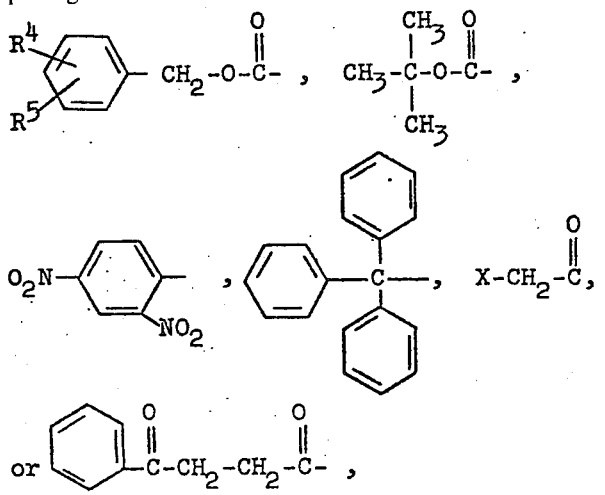

but preferably

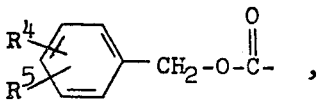

M is a radical selected from the group comprising

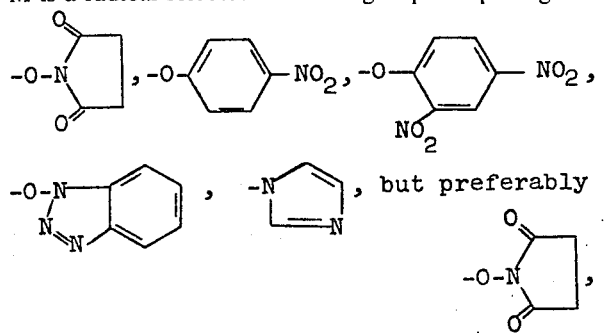

in which R⁴ and R⁵ are as above; in a ratio of at least 0.5 mole of compound VII per mole of compound II, but preferably in a ratio of about 0.5 to about 1.4, and most preferably in a ratio of about 0.8 to about 1.1, in a solvent preferably selected from the group comprising a mixture of water and ethyleneglycol dimethyl ether, dioxane, dimethylacetamide, dimethylformamide, tetrahydrofuran, propyleneglycol dimethyl ether, or the like but preferably water-ethylene glycol dimethyl ether, to produce a compound of the formula

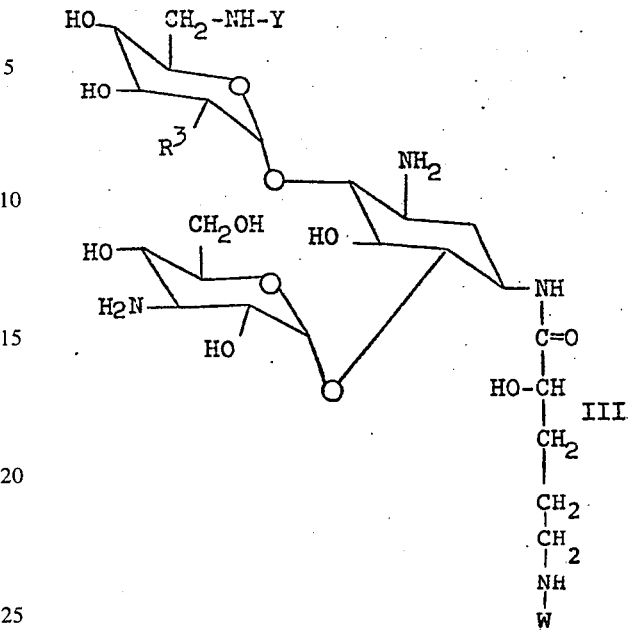

in which R³, Y and W are as above; and

C. removing the blocking groups W and Y from compound III by methods commonly known in the art, and preferably, when W and Y are radicals of the formula

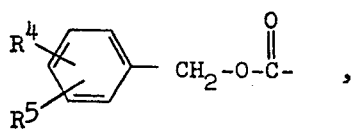

by hydrogenating compound III with hydrogen in the presence of a metal catalyst, preferably selected from the group comprising palladium, platinum, Raney nickel, rhodium, ruthenium and nickel, but preferably palladium, and most preferably palladium on charcoal, in a water-water miscible solvent system, preferably selected from the group comprising water and dioxane, tetrahydrofuran, ethyleneglycol dimethyl ether, propyleneglycol dimethyl ether, or the like, but preferably 1:1 water-dioxane, and preferably in the presence of a catalytic amount of glacial acetic acid to produce the compound of formula IV.

It should be apparent to those knowledgeable in the art that other agents can be used in the process above to acylate the amine functions of the intermediate compounds of the instant invention. This disclosure is meant to include all such acylating agents that produce labile amine blocking groups, said labile blocking groups commonly employed in the synthesis of peptides. The labile blocking groups must be readily removable by methods commonly known in the art. Examples of said labile blocking groups and their removal can be found in the review of A. Kapoor, J. Pharm. Sciences, 59, pp. 1–27 (1970). Functional equivalents as acylating agent for primary amine groups would include corresponding carboxylic chlorides, bromides, acid anhydrides, including mixed anhydrides and particularly the mixed anhydrides prepared from stronger acids such as the lower aliphatic monoesters of carbonic acid, of alkyl and aryl sulfonic acids and of more hindered acids such as diphenylacetic acid. In addition, an acid azide or an active ester of thioester (e.g., with p-nitrophenol, 2,4-dinitrophenol, thiophenol, thioacetic acid) may be used or the free acid itself may be coupled with the kanamycin derivative (II) after first reacting said free acid with N,N'-di-methylchloroforminium chloride [cf. Great Britain 1,008,170 and Novak and Weichet, Experientia XXI/6, 360 (1965)] or by the use of enzymes or of an N,N'-carbonyldiimidazole or an N,N'-carbonylditriazole [cf. Sheehan and Hess, J. Amer. Chem. Soc., 77, 1067, (1955)] or of alkynylamine reagent [cf. R. Buijile and H. G. Viehe, Angew Chem., International Edition 3, 582 (1964)], or of a ketenimine reagent [cf. C. L. Stevens and M. E. Monk, J. Amer. Chem. Soc, 83, 1010 (1961)]. Another equivalent of the acid chloride is a corresponding azolide, i.e., an amide of the corresponding acid whose amide nitrogen is a member of a quasiaromatic five membered ring containing at least two nitrogen atoms, i.e., imidazole, pyrarole, the triazoles, benzimidazole, benzotriazole and their substituted derivatives. As an example of the general method for the preparation of an azolide, N,N'-carbonyldiimidazole is reacted with a carboxylic acid in equimolar proportions at room temperature in tetrahydrofuran chloroform, dimethylformamide, or a similar inert solvent to form the carboxylic acid imidazolide in practically quantitative yield with liberation of carbon dioxide and one mole of imidazole. Dicarboxylic acids yield diimidazolides. The byproduct, imidazole, precipitates and may be separated and the imidazolide isolated, but this is not essential. These reactions are well-known in the art (cf. U.S. Pat. Nos. 3,079,314, 3,117,126 and 3,129,224 and British Pat. Nos. 932,644, 957,570 and 959,054).

Compound IVa, 1-[L-(−)-δ-amino-α-hydroxyvaleryl]-kanamycin A and compound IVb, 1-[L-(−)-δ-amino-α-hydroxyvaleryl]-Kanamycin B, possess excellent anti-bacterial activity that appears superior in some respects against certain pathogenic microorganisms than kanamycin A or B respectively.

Illustrated below are two tables showing the minimal inhibitory concentration (MIC's) of kanamycin A to compound IVa (BB-K23) and kanamycin B compared to compound IVb (BB-K33) against a variety of gram-positive and gram-negative bacteria as obtained by the Steers agar-dilution method. Mueller-Hinton agar medium was used in the study of both tables.

TABLE I (MIC mg./ml.)

| MIC (mcg./ml.) | | | BB-K23 (IVa) | Kanamycin A |
|---|---|---|---|---|
| E. coli | NIHJ | | 1.6 | 0.8 |
| " | Juhl | A15119 | 1.6 | 1.6 |
| " | | A15169 | 1.6 | 1.6 |
| " | KM-R | A20363 | 1.6 | >100 |
| " | | A9844 | 1.6 | 0.8 |
| " | KM-R | A20365 | 0.4 | 100 |
| " | K-12 | | 1.6 | 0.8 |
| " | " KM-R | A20664 | 6.3 | 6.3 |
| " | " KM-R | A20665 | 0.8 | 100 |
| " | W677 | A20684 | 1.6 | 0.8 |
| " | JR/W677 | A20683 | 3.1 | >100 |
| K. pneumoniae D-11 | | | 0.8 | 0.2 |
| " Type 22 No. 3038 | | A20680 | 3.1 | >100 |
| S. marcescens | | A20019 | 3.1 | 1.6 |
| P. aeruginosa D-15 | | | 6.3 | 12.5 |
| " H9 D-113 | KM-R | | 25 | >100 |
| " | | A9923 | 6.3 | 50 |
| " | | A9930 | 0.8 | 12.5 |
| " | | A15150 | 12.5 | 100 |
| " | | A15194 | 6.3 | 25 |
| " | GM-R | A20717 | 12.5 | 50 |
| " | GM-R | A20718 | 12.5 | 50 |
| P. vulgaris | | A9436 | 0.4 | 0.4 |
| " | | A9526 | 0.8 | 0.4 |
| P. mirabilis | | A9554 | 1.6 | 0.8 |
| " | | A9900 | 1.6 | 0.8 |
| P. morganii | | A9553 | 0.8 | 0.8 |
| " | | A20031 | 0.8 | 0.8 |
| S. aureus Smith | | | 0.4 | 0.4 |
| " 209P | SM-R | | 3.1 | 1.6 |

TABLE I-Continued (MIC mg./ml.)

| MIC (mcg./ml.) | | | BB-K23 (IVa) | Kanamycin A |
|---|---|---|---|---|
| " | KM-R | A20239 | 3.1 | 100 |
| Mycobacterium | 607 | | 1.6 | 0.4 |
| " | " KM-R | | >100 | >100 |
| " | " KM,SM-R | | >100 | >100 |
| " | phlei | | 1.6 | 0.4 |
| " | ranae | | 1.6 | 0.4 |

KM-R is kanamycin resistant.
GM-R is gentamicin resistant.
SM-R is streptomycin resistant.

TABLE II (MIC mg./ml.)

| MIC (mcg./ml.) | | | BB-K33 | BB-K34 | Kanamycin B |
|---|---|---|---|---|---|
| E. coli | NIHJ | | 1.6 | 6.3 | 0.4 |
| " | Juhl | A15119 | 1.6 | 6.3 | 0.8 |
| " | | A15169 | 1.6 | 6.3 | 0.8 |
| " | KM-R | A20363 | 3.1 | 6.3 | 100 |
| " | | A9844 | 1.6 | 6.3 | 0.4 |
| " | KM-R | A20365 | 0.4 | 0.4 | 50 |
| " | K-12 | | 1.6 | 3.1 | 0.4 |
| " | " KM-R | A20664 | 6.3 | 25 | 0.8 |
| " | " KM-R | A20665 | 0.8 | 1.6 | 25 |
| " | W677 | A20684 | 1.6 | | 0.8 |
| " | JR/W677 | A20683 | 12.5 | | 100 |
| K. pneumoniae D-11 | | | 0.4 | 1.6 | 0.1 |
| " Type 22 3038 | | A20680 | 25 | 25 | >100 |
| S. marcescens | | A20019 | 12.5 | | 0.8 |
| P. aeruginosa D-15 | | | 3.1 | 12.5 | 6.3 |
| " H9 D-113 | | | 100 | 50 | >100 |
| " | KM-R | | | | |
| " | | A9923 | 6.3 | 25 | 25 |
| " | | A9930 | 1.6 | 3.1 | 6.3 |
| " | | A15150 | 12.5 | 25 | 25 |
| " | | A15195 | 12.5 | 12.5 | 12.5 |
| " | GM-R | A20717 | 12.5 | | 50 |
| " | GM-R | A20718 | 12.5 | | 25 |
| P. vulgaris | | A9436 | 1.6 | 3.1 | 0.2 |
| " | | A9526 | 1.6 | 3.1 | 0.2 |
| P. mirabilis | | A9554 | 3.1 | 12.5 | 0.4 |
| " | | A9900 | 1.6 | 6.3 | 0.8 |
| P. morganii | | A9553 | 3.1 | 6.3 | 0.8 |
| " | | A20031 | 3.1 | 12.5 | 0.8 |
| S. aureus Smith | | | 0.4 | 1.6 | 0.1 |
| " | 209P SM-R | | 3.1 | 3.1 | 0.8 |
| " | KM-R | A20239 | 3.1 | 6.3 | 50 |
| Mycobacterium | 607 | | 1.6 | 6.3 | 1.6 |
| " | KM-R | " | >100 | >100 | >100 |
| " | KM,SM-R | | >100 | >100 | >100 |
| " | phlei | | 0.4 | 6.3 | 1.6 |
| " | ranae | | 1.6 | 6.3 | 1.6 |

The above MIC data show that compounds IVa and IVb are substantially more active against a number the test organisms, particularly the pseudomonas and other kanamycin resistant organisms.

The compounds IV are valuable as antibacterial agents, nutritional supplements in animal feeds, therapeutic agents in poultry and animals, including man, and are especially valuable in the treatment of infectious diseases caused by Gram-positive and Gram-negative bacteria.

The compound IV when administered orally are useful as an adjunctive treatment for preoperative sterilization of the bowel. Both aerobic and anaerobic flora which are suseptible to these drugs are reduced in the large intestine. When accompanied by adequate mechanical cleansing, they are useful in preparing for colonic surgery.

The compounds IV are effective in the treatment of systemic bacterial infections in man when administered parenterally in the dosage range of about 250 mg. to about 3000 mg. per day in divided doses three or four times a day. Generally the compounds are effective when administered at a dosage of about 5.0 to 7.5 mg./kg. of body weight every 12 hours.

EXAMPLE 1

Preparation of
L-δ-Benzyloxycarbonylamino-α-hydroxyvaleric acid
(VI).

To a stirred solution of 400 mg (3.0 m moles) of L-δ-amino-α-hydroxyvaleric acid* and 250 mg (6.5 m moles) of sodium hydroxide in 25 ml of water was added dropwise 580 mg (3.3 m moles) of carbobenzoxy chloride over a period of 30 minutes at 0°–5°C. The mixture was stirred for an hour at 5°–15°C, washed with 25 ml of ether, adjusted to pH 2 with hydrochloric acid and extracted with three 30-ml portions of ether. The combined ethereal solution was shaken with 10 ml of a saturated sodium chloride solution, dried over anhydrous sodium sulfate and evaporated in vacuo to give crystals which were recrystallized from benzene to yield 631 mg (78%) of VI, mp 110°–111°C.; infrared spectrum [IR(KBr)]: 3460, 3350, 1725, 1685, 1535, 1280, 730, 690 cm$^{-1}$. Nuclear magnetic resonance spectrum [NMR(acetone-$d_6$)]: δ (in ppm) 1.70(4H, m) 4.14(2H, q, J=4.5Hz), 4.19(1H, m), 4.82(2H, s), 6.2(3H, broad), 7.25(5H, s). $[\alpha]_D^{25}$ + 1.6 (c 10, MeOH).

Anal Calcd for $C_{13}H_{17}NO_5$: C, 58.42; H, 6.41; N, 5.24.
Found: C, 58.36; H, 6.50; N, 5.27.
*S. Ohshiro et al., Yakugaku Zasshi, 87, 1184 (1967).

EXAMPLE 2

N-Hydroxysuccinimide ester of
L-γ-benzyloxycarbonylamino-α-hydroxybutyric acid
(VII)

To a stirred and chilled solution of 535 mg (2.0 m moles) of VI and 230 mg (2.0 m moles) of N-hydroxysuccinimide in 55 ml of ethyl acetate was added 412 mg (2.0 m moles) of N, N'-dicyclohexylcarbodiimide (DCC). The mixture was stirred for 3 hours at room temperature and filtered to remove precipitated N, N'-dicyclohexylurea. The filtrate was evaporated in vacuo to yield 780 mg (100%) of viscous syrup (VII). IR(Neat): $\gamma_{C=O}$ 1810, 1785, 1725 cm$^{-1}$.

EXAMPLE 3

1-[L(−)-δ-amino-α-hydroxyvaleryl] kanamycin A,
[BB-K 23, IVa]

To a stirred solution of 1.24 g (2.0 m moles) of kanamycin A (IIa) in 12 ml of water and 60 ml of 1,2-dimethoxyethane (DME) was added dropwise 780 mg (2.0 m moles) of VII in 10 ml of DME. The mixture was stirred overnight and then evaporated to dryness in vacuo. The residue was treated with 20 ml of water and shaken with two 30-ml portions of water-saturated butanol. The combined butanol layer was evaporated in vacuo to give 1.36 g of solid, which was dissolved in 10 ml of water, 10 ml of dioxane and 1 ml of acetic acid, and hydrogenated overnight with 200 mg of 10% palladium on charcoal at atmospheric pressure at ordinary temperature. The hydrogenated mixture was filtered and the filtrate evaporated to dryness in vacuo. The residue was dissolved in 20 ml of water. The solution was passed through a column of Amberlite CG-50** ($NH_4^+$, 15 ml), which was washed with 80 ml of water and then eluted with 760 ml of 0.1N and 880 ml of 0.2 N $NH_4OH$. The eluate was collected in 10-ml fraction. Tube Nos. 109 to 172 which upon thin layer chromatography (TLC)* showed Rf 0.18 (S-110, ninhydrin) were combined, evaporated in vacuo and freeze-dried to give 330 mg(28%) of IVa, mp 185° (dec). IR(KBr): 1635, 1570 cm$^{-1}$.

Anal Calcd for $C_{23}H_{45}N_5O_{13} \cdot H_2O$: C, 43.57: H, 7.16; N, 10.59.
Found: C, 43.25; H, 7.12; N, 9.83.
**Amberlite CG-50 is the tradename for the chromatographic grade of a weakly acidic cationic exchange resin of a carboxylic-polymethacrylic type.
*TLC: silica gel plate, CHCl$_3$-MeOH-28% NH$_4$OH-H$_2$O (1:4:2:1).

EXAMPLE 4

Preparation of N-(Benzyloxycarbonyloxy)succinimide

N-Hydroxysuccinimide[1] (23 g., 0.2 mole) was dissolved in a solution of 9 g. (0.22 mole) of sodium hydroxide in 200 ml. of water. To the stirred solution was added dropwise 34 g. (0.2 mole) of carbobenzoxy chloride with water-cooling and then the mixture was stirred at room temperature overnight to separate the carbobenzoxy derivative which was collected by filtration, washed with water and air-dried. Yield 41.1 g. (82%). Recrystallization from benzene-n-hexane (10:1) gave colorless prisms melting at 78°–79° C.
1. G. W. Anderson et al., J. Am. Chem. Soc., 86, 1839 (1964).

EXAMPLE 5

Preparation of 6'-Carbobenzoxykanamycin A (IIa)

A solution of 42.5 g. (90 m.moles) of kanamycin A free base in 450 ml. of water and 500 ml. of dimethylformamide (DMF) was cooled below 0° C. and stirred vigorously. To the solution was added dropwise over a period of about two hours a solution of 22.4 g. (90 m.mole) of N-(benzyloxycarbonyloxy)succinimide in 500 ml. of DMF. The mixture was stirred at −10° to 0° C. overnight and then at room temperature for one day. The reaction mixture was evaporated under reduced pressure below about 50° C. The oily residue was dissolved in a mixture of 500 ml. water and 500 ml. butanol, the mixture being filtered to remove insoluble material and separated into two layers. The butanol and aqueous layers were treated with butanol-saturated water (500 ml. X 2) and water-saturated butanol (500 ml. X 2), respectively, using a technique similar to counter current distribution. The three aqueous layers were combined and evaporated to dryness under reduced pressure to give an oily residue, a part of which crystallized on standing at room temperature. To the residue including the crystals was added about 100 ml. of methanol, which dissolved the oil and separated it from the crystals. After adding about 300 ml. of ethanol, the mixture was kept at room temperature overnight to give a crystalline mass which was collected by filtration. It weighed 44 g. The product contained a small amount of kanamycin A as indicated by thin layer chromatography using n-propanolpyridine-acetic acid-water (15:10:3:12) as the solvent system and ninhydrin as the spray reagent.

The crude product was dissolved in 300 ml. of water and chromatographed on a column (30 mm. diameter) of CG-50 ion-exchange resin ($NH_4^+$ type, 500 ml.). The column was irrigated with 0.1 N ammonium hydroxide solution and the eluate was collected in 10-ml. fraction. The desired product was contained in tube numbers 10–100, while kanamycin A recovered from slower-moving fractions and the position isomer(s) of the product seemed to be contained in the faster-moving fractions. The fractions 10–110 were combined and evaporated to dryness under reduced pressure to give 24.6 g. (45%) of a colorless product 6'-carbobenzoxykanamycin A (II) [6'-Cbz-kanamycin A], which began to melt and color at 204° C. and decomposed at 212° C. with gas evolution. $[\alpha]_D$ +106° (c=2, $H_2O$).

| TLC (silica gel $F_{254}$; ninhydrin) Solvent System | Rf value | | |
|---|---|---|---|
| | 6'-Cbz-Kana-mycin A | | Kana-mycin A |
| n—ProH—pyridine—AcOH—$H_2O$ (15:10:3:12) | 0.42 (main) | 0.33 0.4 minor | 0.04 |
| Acetone—AcOH—$H_2O$ (20:6:74) | | 0.24 | 0.14 |
| $CHCl_3$—MeOH—c.N-$H_4OH$—$H_2O$ (1:4:2:1) | | 0.76 | 0.50 |
| AcOMe—n—PrOH—C.N-$H_4OH$ (45:105:60) | 0.22* | | 0.04* |

*Detected by anthrone-sulfuric acid.

The final product was found to be accompanied by two minor components by TLC with one of the solvent systems tested. However, the final product was used without further purification for the preparation of BB-K23(IVa).

EXAMPLE 6

Preparation of 6'-Carbobenzoxykanamycin B (IIb)

To a chilled solution of 8.1 g. (0.0168 mole) of kanamycin B in 120 ml. of water and 80 ml. of 1,2-dimethoxyethane was added dropwise with stirring a solution of 4.2 g. (0.0168 mole) of N-(benzyloxycarbonyloxy)succinimide in 40 ml. of 1,2-dimethoxyethane. The reaction mixture was stirred overnight and evaporated under reduced pressure. The residue was dissolved in 100 ml. of water and shaken twice with 50 ml. of water-saturated n-butanol. The aqueous layer was separated and adsorbed on a column of 100 ml. of CG-50 ($NH_4^+$ type). The column was washed with 200 ml. of water, eluted with 0.05 N $NH_4OH$. The eluate was collected in 10-ml. fraction. Fractions 121 to 180 were collected, evaporated and freeze-dried to give 1.58 g. (15%) of the desired product. Fractions 1 to 120 were evaporated and re-chromatographed on CG-50 ($NH_4^+$) to give 1.21 g. (12%) of the product (IIb). M.p. 151°–152° C. (dec.). $[\alpha]_D^{24}$+104° (C. 2.5, $H_2O$). $\gamma_{C=O}$ 1710 $cm^{-1}$.

Anal. calc'd. for $C_{26}H_{43}N_4O_{12}$: C, 50.56; H, 7.02; N, 11.34.

Found: C, 50.71; H, 7.38; N, 11.48.

TLC (silica gel F254), RF 0.03 in n-PrOH-pyridine-AcOH-$H_2O$ (15:10:3:12); Rf 0.16 in acetone-AcOH-$H_2O$ (20:6:74).

EXAMPLE 7

Preparation of 1[L(−)-δ-Amino-α-hydroxyvaleryl] kanamycin B,[BB-K 33 (IVb)]

To a stirred solution of 618 mg (1 m mole) of IIb in 30 ml of water-DME (1:2) was added 364 mg (1 m mole) of VII in 10 ml of dry DME in one portion. The mixture was stirred overnight at room temperature and evaporated in vacuo. The aqueous concentrate was extracted with two 20-ml portions of water-saturated n-butanol. The butanol extracts were evaporated to dryness to give 530 mg of solid, which was dissolved in 40 ml of water-DME(1:1) and hydrogenated overnight with 150 mg of palladium on carbon at atmospheric pressure at room temperature. The catalyst was removed by filtration. The filtrate was evaporated in vacuo to remove most of the organic solvent. The aqueous solution was charged on a column of Amberlite CG-50($NH_4^+$, 14 ml), which was washed with 140 ml of water and then eluted with 410 ml of 0.1 N, 760 ml of 0.2N, 650 ml of 0.5N and 510 ml of 1.0 N $NH_4OH$. The eluate was collected in 10-ml fraction. Tube Nos. 127 to 141 which showed Rf 0.22 by TLC on silica gel plate (S-110, ninhydrin) were pooled, evaporated in vacuo and lyophilized to give 103 mg (17%) of BB-K 33, mp 185°–190°C(dec). IR(KBr): $\gamma_{C=O}$ 1635 $cm^{-1}$.

Anal Calcd for $C_{23}H_{46}N_6O_{12} \cdot 2H_2CO_3$: C, 41.55; H, 6.97; C, 11.63.

Found: C, 41.44; H, 7.09; C, 11.75

Tube Nos. 195 to 216 which showed Rf 0.11 (S-110, ninhydrin) were combined, evaporated in vacuo and lyophilized to give 42 mg (7%) of BB-K 34, mp 180°–185°C (dec). IR (KBr): $\gamma_{C=O}$ 1640 $cm^{-1}$.

Anal Calcd for $C_{28}H_{55}N_7O_{14} \cdot 4H_2CO_3$: C, 39.96; H, 6.60; N, 10.19.

Found: C, 39.57; H, 6.63; N, 10.64.

The identity of the compound BB-K34 was not established although it is known that it is a diacylated derivative of kanamycin B possessing weak antibacterial activity as compared to kanamycin B and BB-K33 (IVb).

EXAMPLE 8

Preparation of the Monosulfate Salt of 1-[L-(−)-δ-amino-α-hydroxyvaleryl]kanamycin A or B.

One mole of 1-[L-(−)-δ-amino-α-hydroxyvaleryl] kanamycin A or B is dissolved in 1 to 3 liters of water. The solution is filtered to remove any undissolved solids. To the chilled and stirred solution is added one mole of sulfuric acid dissolved in 500 ml. of water. The mixture is allowed to stir for 30 minutes, following which cold ethanol is added to the mixture till precipitation occurs. The solids are collected by filtration and are determined to be the desired monosulfate salt.

EXAMPLE 9

Preparation of the Disulfate Salt of 1-[L-(−)-δ-amino-α-hydroxyvaleryl]kanamycin A or B.

Thirty-five grams of 1-[L-(−)-δ-amino-α-hydroxyvaleryl]kanamycin A or B (as the monobicarbonate trihydrate) is dissolved in 125 ml. of deionized water.

The pH is adjusted to 7-7.5 with 50% V/V sulfuric acid. Eight and one half grams of Darco G-60 (activated charcoal) is added and the mixture is slurried at ambient room temperature for 0.5 hour. The carbon is removed by suitable filtration and washed with 40 ml. of water. The water wash is added to the filtrate.

The combined filtrate-wash above is adjusted to pH 2-2.6 with 50% V/V sulfuric acid. A large amount of carbon dioxide evolves. The solution is left at house vacuum with stirring for 20 minutes to expel additional carbon dioxide.

Eight and one half grams of Darco G-60 is added to the degassed solution. The mixture is slurried for 0.5 hour at ambient room temperature. The carbon is removed by suitable filtration and and washed with 35 ml. of deionized water. The water is added to the filtrate.

The combined filtrate-wash is adjusted to pH 1-1.3 with 50% V/V sulfuric acid. This solution is added with rapid stirring over a 10 minute period to 600-800 ml. of methanol (3-4 volumes of methanol). The mixture is stirred for 5 minutes at pH 1-1.3, passed through a 100 mesh screen, stirred for 2 minutes and allowed to settle for 5 minutes. Most of the supernatant is decanted. The remaining slurry is suitably filtered, washed with 200 ml. of methanol and vacuum dried at 50°C. for 24 hours to yield the appropriate disulfate salt.

We claim:
1. A compound having the formula

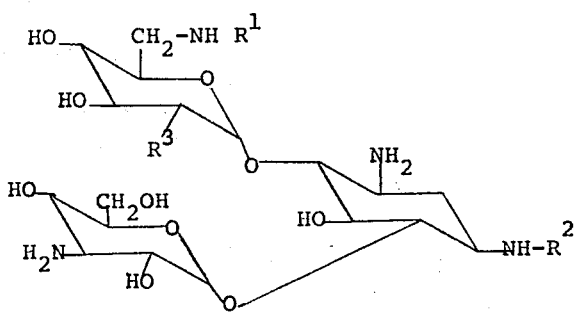

in which $R^1$ is H, $R^2$ is L-(−)-δ-amino-α-hydroxyvaleryl and $R^3$ is OH or $NH_2$; or a nontoxic pharmaceutically acceptable salt thereof.

2. The compound of claim 1 wherein $R^1$ is H, $R^2$ is L-(−)-δ-amino-α-hydroxyvaleryl and $R^3$ is OH; or a nontoxic pharmaceutically acceptable acid addition salt thereof.

3. The compound of claim 1 wherein $R^1$ is H, $R^2$ is L-(−)-δ-amino-α-hydroxyvaleryl and $R^3$ is $NH_2$; or a nontoxic pharmaceutically acceptalble acid addition salt thereof.

4. The monosulfate salt of the compound of claim 2.
5. The monosulfate salt of the compound of claim 3.
6. The disulfate salt of the compound of claim 2.
7. The disulfate salt of the compound of claim 3.

* * * * *